Jan. 8, 1935.     C. DE L. RICE     1,987,365
SPRING SUSPENSION
Filed Feb. 9, 1934
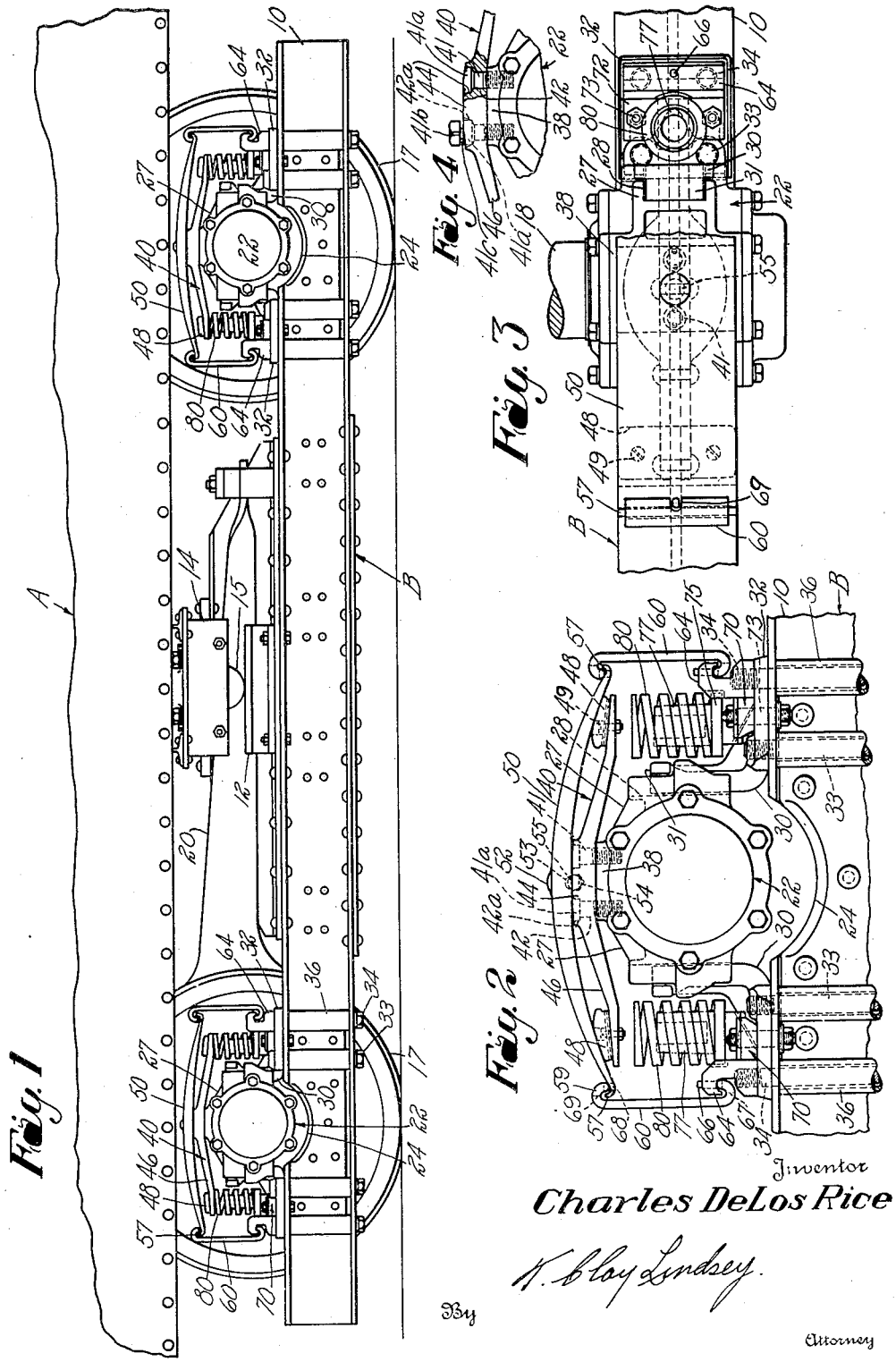
Inventor
*Charles DeLos Rice*
By *N. Clay Lindsey.*
Attorney Patented Jan. 8, 1935

1,987,365

UNITED STATES PATENT OFFICE 1,987,365

SPRING SUSPENSION

Charles De Los Rice, West Hartford, Conn.

Application February 9, 1934, Serial No. 710,468

8 Claims. (Cl. 105—224)

This invention relates to improvements in spring suspensions, and particularly to improvements in spring suspensions for railway coaches or the like, and has for one of its objects the provision of a spring suspension of the character described in which the spring is resiliently limited in both directions of flexure.

A further object resides in the provision of a spring suspension of the character described which is unusually resilient within the normal limitation of flexure to provide for unusually soft riding characteristics of the coach.

A still further object resides in the provision of a spring suspension of the character described which is so simply and ruggedly constructed that there will be little or no danger of any failure of the same in use.

An additional object resides in the provision of a spring suspension which is economical to manufacture and simple and easy to assemble and install.

Other objects and advantages of the invention will appear as the description proceeds.

In the accompanying drawing in which similar reference numerals are used to designate like parts throughout, I have illustrated a suitable mechanical embodiment of the idea of the invention. The drawing, however, is to be taken for the purpose of illustration only and not as limiting the invention the scope of which is to be measured entirely by the scope of the appended claims.

In the drawing,

Fig. 1 is an elevational view of a truck for a railway coach embodying a spring suspension constructed according to the idea of this invention, a fragmentary portion of the coach carried by the truck being illustrated;

Fig. 2 is an elevational view of my improved spring suspension showing the spring in its position of maximum flexure due to road shock;

Fig. 3 is a plan view of the spring suspension illustrated in Fig. 2; and

Fig. 4 is an elevational view of a fragmentary portion of the mechanism illustrated in Fig. 2 showing the preferred manner of securing together two of the members illustrated in Fig. 2.

Referring to the drawing in detail, A generally indicates a railway coach carried upon a truck generally designated at B. This truck comprises a pair of longitudinal bolster members one of which is indicated at 10. Each of the bolster members carries on its upper surface at the center thereof a track member, as indicated at 12, and a similar track member, as indicated at 14, is secured to the under portion of the coach A and overlies the member 12, a roller 15 being included between the two track members to support the coach upon the bolster members and permit turning of the truck and bolster members relative to the coach body without any substantial friction. The truck B is supported upon rail wheels as indicated at 17, these wheels being operatively secured upon axles, as indicated at 18 in Fig. 3. Each axle may be surrounded by a quill carrying a motor for driving the coach, as particularly illustrated in my copending application Ser. No. 707,201, filed January 18, 1934, in which the casing of each motor is restrained against rotation by a suitable torque arm, as indicated at 20. Referring particularly to Fig. 3, it will be observed that each of the axles 18 upon which the wheels 17 are secured is provided with ends projecting beyond the wheels and rotatably received in antifriction bearing boxes, generally indicated at 22. Bolster members 10 of an underslung truck frame are positioned below these bearing boxes and have cut out and reinforced portions, as indicated at 24, immediately below the bearing boxes to provide for substantial vertical movement of the bolsters relative to the bearing boxes. Each bearing box is provided at the opposite vertical sides thereof with lateral extensions, as indicated at 27, in Fig. 2, and these extensions are provided with vertically disposed guideways, as indicated at 28. A cooperating bracket member, indicated at 30, is secured to the upper surface of each bolster member 10, one upon each side of each bearing box 22. Each of these bracket members 30 has a vertical portion 31 adapted to slide in the associated vertical guideway 28 provided in the extension 27 of the bearing box 22 and a horizontal portion 32 rigidly secured to the upper surface of the bolster member 10 by means of bolts 33 and 34. Preferably the bolster members 10 are H-section members provided with upper and lower horizontal flanges and an interposed vertical web, and in order to render the attachment of the brackets 30 to these bolster members more rigid and secure, I have extended the bolts 33 and 34 through both the upper and lower flanges, as illustrated in Fig. 1, and have surrounded the portions of the bolts between such flanges with tubular spacers, as indicated at 36. The upper portion of the bearing box 22 between the brackets 27 is provided with a flat table portion 38, and a member generally indicated at 40 is secured to this table portion by means of screws 41 extending through suitable apertures in the member 40 and into screw threaded apertures 42 in the table portion 38 of the journal housing 22. In the embodiment illustrated, I have provided two such steel screws for each of the members 40. These screws are positioned and retained in place in a special manner as it is essential that they do not become loose and permit the member 40 to rock on the journal housing. Referring to Figs. 2 and 4, it will be observed that each of the apertures 42 is provided in the upper end thereof with a circular counterbore 42a, larger in diameter than the aperture 42. Each of the screws 41 is provided above the threaded portion thereof with a round head or shoulder 41a adapted to fit tightly in the counterbore 42a and fill the same. Above the round head 41a the screw is provided with a squared head 41b for turning the screw into the screw threaded aperture 42. Between the round head 41a and the squared head 41b, the screw is provided with a weakened portion in the form of an annular groove 41c having a diameter somewhat less than the root diameter of the screw thread or any other portion of the screw. In applying the screws 41 each screw is turned down in the corresponding bore 42 until it becomes tight. The head of the screw is then pounded and the screw turned until it becomes absolutely solid. The squared head is then twisted off at the weakened portion 41c and the upper end of the screw is surfaced down until it is flush with the upper surface of the member 40. Preferably, one or more lateral recesses are provided in the wall of each counterbore 42a and after the upper surface of the screw is brought flush with the upper surface of the member 40, portions of the head 41a are peened into these recesses to permanently lock the screw against rotation. This member 40 comprises a central portion 44 having flat upper and lower surfaces and suitable apertures for the bolts 41, and integral tapered arms, as indicated at 46, extending one from each end of the central portion, these arms 46 extending outwardly and somewhat downwardly from the central portion, as illustrated in Figs. 1 and 2. Each of the arms 46 carries upon its upper surface adjacent to the outer end thereof a pad 48 preferably formed of live rubber secured to the arm by suitable means, such as bolts 49. A spring 50 is mounted upon the upper surface of the central portion 44 of the member 40 and extends slightly beyond the member 40 at each end thereof. This spring is in the form of a single resilient steel member gradually tapered from the center thereof toward each end and is of substantial width as clearly illustrated in Fig. 3. At the center thereof, a portion of the metal forming the spring is struck up, as indicated at 52, to provide a hemispherical depression 53 at the center of the underside of the spring. The member 40 is provided centrally thereof with a corresponding depression or well 54, and a ball 55 is mounted in the depression 54 so that the upper half of it projects into the depression 53 in the spring to position the spring and maintain the spring centrally located with respect to the member 40. The metal struck up to form the depression 53 is displaced while the spring is hot and extends above the top of the spring in the form of a bulge or dome, as indicated at 52, and provides at the central cross sectional plane of the spring a section of materially greater modulus than the remainder of the spring to strengthen the spring at the point of greatest strain, thus providing a locating means for the spring without weakening the same. The outer ends of the spring are bent up, as indicated at 57, to provide hooks adapted to cooperate with the bent-over ends 59 of links 60 by means of which the links are maintained against separation from the springs. The bolster members 10 are suspended from the spring by the fulcruming of the hardened end of the bent over portion of the link on the hardened upper surface of the spring. The lower bent over ends of the links 60 are adapted to cooperate with suspension brackets in the form of hooks 64 into which the upper ends of the bolts 34 are threaded to rigidly secure the hooks against the upper surfaces of the horizontal portions 32 of the respective bracket members 30. The links fulcrum at both ends to provide a free floating or rocking suspension for the underslung truck frame upon the springs. Preferably, the links 60 are maintained against lateral movement relative to the hooks 64 by means of stud bolts or plugs 66 which extend through the hooks and into suitable apertures 67 provided in the bent over lower ends of the links 60. The upper ends of the links 60 may be secured against lateral movement relative to the spring 50 by means of similar plugs 68 which extend into suitable apertures 69 in the upper bent over ends of the links 60. Secured upon the upper surface of the horizontal portion of each of the brackets 30 between the bolts 33 and 34, is a spring support, generally indicated at 70. Each spring support comprises an integral member having a rectangular lower portion or base provided with apertured ears, as indicated at 72, through which bolts 73 extend to secure the spring supports to the bracket 30 and to the bolster members 10. These apertures extend through one side of the base, as shown in Fig. 3, so that the supports may be removed laterally from the bolster after removing the suspension brackets 64. Above the base portion, each of the spring supports is provided with a shoulder upon which is positioned an angular ring 75 and above the shoulder there is a tapered hollow substantially cylindrical core 77, integral with the base. A coiled compression spring 80, preferably of rectangular cross section, is mounted upon each of the rings 75 and has a portion surrounding the respective extension 77 and a portion extending above the core to normally contact the corresponding under surface of the arm 46 of the member 40 adjacent to the outer end thereof, as illustrated in Fig. 1, there being a spring 80 for each arm 46 of each member 40. The portion of each of the extensions or cores immediately above the respective ring 75 is truly cylindrical and of such a diameter as to fit snugly within the respective spring 80 for a limited distance to prevent rattling thereof, and is then tapered beyond or upward to lend free action and to prevent chafing.

From the construction above illustrated, it will be observed that when the spring suspension is in its normal load-carrying position, as illustrated in Fig. 1, the springs 50 are clear of the pads 48, and the upper ends of the springs 80 bear against the under surface of the members 40 at the respective ends thereof. When owing to a severe road shock, the bearing box 22 is raised relative to the bolster member 10, at its limit of flexure the ends of each spring 50 bear upon the pads 48 to resiliently but definitely limit the extent of flexure of the spring and insure that the spring will not be broken by unusually severe road shocks. In this position of maximum flexure, as illustrated in Fig. 2, the upper ends of the springs 80 are clear of the members 40. The reaction of the springs 50 after the shock is passed will tend to violently raise the bolster members 10 until they bottom with a jolt against the under surface of the bearing boxes 22. In the present construction, however, this tendency is corrected by the presence of the springs 80 the upper ends of which will engage the members 40 when the bolster members and bearing boxes have returned to normal position, and any reaction of the springs 50 tending to raise the bolster members past this normal position will be resiliently resisted by the springs 80 so that any jolt which might occur from a violent contact of the bolster members with the bottom of the bearing boxes is eliminated. This construction permits the use of unusually sensitive springs 50 definitely limited in both directions of flexure and provides for an unusually stable and easy riding coach.

While I have illustrated and described a particular mechanical embodiment of the idea of my invention, it is to be understood that the invention is not limited thereto and that such changes in the size, shape, and arrangement of parts may be resorted to as come within the scope of the appended claims.

Having now described my invention so that others skilled in the art may clearly understand the same, what I desire to secure by Letters Patent is as follows:

I claim as my invention:

1. A spring suspension for supporting a railway coach upon a truck having wheel carrying axles, bearing boxes carried by the projecting ends of said axles, bolster members underlying said bearing boxes, and means to restrain said bolster members against lateral movement relative to said bearing boxes, comprising a member centrally rigidly secured to the top of each of said bearing boxes, a spring positioned on each of said members overlying the same and restrained against lateral movement relative thereto, suspension means operatively connecting the ends of said springs to said bolster members, resilient means between the ends of said first members and said springs to resiliently limit the downward flexure of said springs, and resilient means between said bolster members and the ends of said first members to resiliently limit the upward flexure of said springs.

2. A spring suspension for supporting a railway coach upon a truck having wheel carrying axles, bearing boxes carried by the projecting ends of said axles, bolster members underlying said bearing boxes, and means to restrain said bolster members against lateral movement relative to said bearing boxes comprising a member centrally rigidly secured to the top of each of said bearing boxes, a spring positioned on each of said members overlying the same, a ball and socket connection between said spring and said member to restrain said spring against floating movement relative to said member, suspension means operatively connecting the ends of said springs to said bolster members, resilient means between the ends of said first members and said springs to resiliently limit the downward flexure of said springs, and resilient means between said bolster members and the ends of said first members to resiliently limit the upward flexure of said springs.

3. A spring suspension for supporting a railway coach upon a truck having wheel carrying axles, bearing boxes carried by the projecting ends of said axles, bolster members underlying said bearing boxes, and means to restrain said bolster members against lateral movement relative to said bearing boxes comprising a member centrally rigidly secured to the top of each of said bearing boxes, a spring consisting of a single member tapered from the center to the opposite ends thereof positioned on each of said members overlying the same and restrained against lateral movement relative thereto, suspension means operatively connecting the ends of said springs to said bolster members, resilient means between the ends of said first members and said springs to resiliently limit the downward flexure of said springs, and resilient means between said bolster members and the ends of said first members to resiliently limit the upward flexure of said springs.

4. A spring suspension for supporting a railway coach upon a truck having wheel carrying axles, bearing boxes carried by the projecting ends of said axles, bolster members underlying said bearing boxes, and means to restrain said bolster members against lateral movement relative to said bearing boxes comprising a member having a central portion rigidly attached to the top of each of said bearing boxes and tapered arms extending outwardly and downwardly from said central portion, a spring supported on said central portion restrained against lateral movement relative thereto and overlying said arms, suspension means operatively connecting the ends of said springs to said bolster members, resilient means between the ends of said first members and said springs to resiliently limit the downward flexure of said springs, and resilient means between said bolster and the ends of said first members to resiliently limit the upward flexure of said springs.

5. A spring suspension for supporting a railway coach upon a truck having wheel carrying axles, bearing boxes carried by the projecting ends of said axles, bolster members underlying said bearing boxes, and means to restrain said bolster members against lateral movement relative to said bearing boxes, comprising a member centrally rigidly secured to the top of each of said bearing boxes, a spring positioned on each of said members overlying the same and restrained against lateral movement relative thereto, suspension means operatively connecting the ends of said springs to said bolster member, resilient pads on the upper surface of said first member adjacent to the opposite ends thereof to resiliently limit the downward flexure of said springs, and resilient means between said bolster and the ends of said first members to resiliently limit the upward flexure of said springs.

6. A spring suspension for supporting a railway coach upon a truck having wheel carrying axles, bearing boxes carried by the projecting ends of said axles, bolster members underlying said bearing boxes, and means to restrain said bolster members against lateral movement relative to said bearing boxes comprising a member centrally rigidly secured to the top of each of said bearing boxes, a spring positioned on each of said members overlying the same and restrained against lateral movement relative thereto, suspension means operatively connecting the ends of said springs to said bolster members, resilient means between the ends of said first members and said springs to resiliently limit the downward flexure of said springs, and coiled springs mounted on said bolster members and adapted to bear against the under surface of said first member adjacent to the ends thereof to resiliently limit the upward flexure of said spring.

7. A spring suspension for supporting a railway coach upon a truck having wheel carrying axles, bearing boxes carried by the projecting ends of said axles, bolster members underlying said bearing boxes, and means to restrain said bolster members against lateral movement relative to said bearing boxes comprising a member centrally rigidly secured to the top of each of said bearing boxes, a spring positioned on each of said members overlying the same and restrained against lateral movement relative thereto, suspension means operatively connecting the ends of said springs to said bolster members, resilient means between the ends of said first members and said springs to resiliently limit the downward flexure of said springs, spring supports mounted on said bolster members, coiled compression springs mounted on said supports and bearing at their upper ends against the under surface of said first member adjacent to the ends thereof to resiliently limit the upward flexure of said springs.

8. A spring suspension for supporting a railway coach upon a truck having wheel carrying axles, bearing boxes carried by the projecting ends of said axles, bolster members underlying said bearing boxes, and means to restrain said bolster members against lateral movement relative to said bearing boxes comprising a member centrally rigidly secured to the top of each of said bearing boxes, a spring positioned on each of said members overlying the same and restrained against lateral movement relative thereto, suspension means operatively connecting the ends of said springs to said bolster members, resilient means between the ends of said first members and said springs to resiliently limit the downward flexure of said springs, spring supports each comprising a base having a shoulder, a tapered extension above said shoulder and a ring on said shoulder surrounding said extension, a coiled compression spring mounted on said ring and surrounding the extension of each of said supports and bearing at their upper ends against the under surface of said first member adjacent to the ends thereof to resiliently limit the upward flexure of said springs.

CHARLES DE LOS RICE.